(12) United States Patent
Lee et al.

(10) Patent No.: US 8,027,655 B2
(45) Date of Patent: Sep. 27, 2011

(54) RECEIVER APPARATUS AND METHOD FOR TRACKING AND REJECTING TRANSMIT SIGNAL IN WIRELESS COMMUNICATION SYSTEM

(75) Inventors: Hee-Hyun Lee, Hwaseong-si (KR);
Hoon-Tae Kim, Yongin-si (KR);
Jong-Won Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 12/292,983

(22) Filed: Dec. 2, 2008

(65) Prior Publication Data
US 2009/0143037 A1  Jun. 4, 2009

(30) Foreign Application Priority Data
Dec. 3, 2007  (KR) .................. 10-2007-0124195

(51) Int. Cl.
*H04B 1/10* (2006.01)
(52) U.S. Cl. .................. 455/296; 455/317; 455/318
(58) Field of Classification Search .................. 455/296, 455/317, 318
See application file for complete search history.

(56) References Cited

U.S. PATENT DOCUMENTS

| | | | |
|---|---|---|---|
| 6,304,592 B1 * | 10/2001 | Davidovici et al. ............ 375/152 |
| 6,738,605 B1 * | 5/2004 | Gilberton et al. .......... 455/127.1 |
| 6,741,449 B1 * | 5/2004 | Pasternak ...................... 361/303 |
| 6,937,666 B2 * | 8/2005 | Pasternak et al. ............. 375/272 |
| 6,970,717 B2 * | 11/2005 | Behrens et al. ............ 455/553.1 |
| 7,184,716 B2 * | 2/2007 | Mohan ............................. 455/78 |
| 7,202,812 B2 * | 4/2007 | Krikorian et al. ............. 342/198 |
| 7,203,472 B2 * | 4/2007 | Seppinen et al. .......... 455/226.1 |
| 7,259,417 B2 * | 8/2007 | Pasternak ...................... 257/312 |
| 7,308,024 B2 * | 12/2007 | Mohan ........................... 375/219 |
| 7,310,215 B2 * | 12/2007 | Pasternak ...................... 361/277 |
| 7,697,885 B2 * | 4/2010 | Stoddard .......................... 455/1 |
| 7,702,362 B2 * | 4/2010 | Behrens et al. ............ 455/553.1 |
| 2003/0194973 A1 * | 10/2003 | Pasternak ........................ 455/77 |
| 2004/0009752 A1 * | 1/2004 | Mohan ............................. 455/78 |
| 2004/0042539 A1 * | 3/2004 | Vishakhadatta et al. ...... 375/216 |
| 2004/0136317 A1 * | 7/2004 | Mohan .......................... 370/218 |
| 2005/0245216 A1 * | 11/2005 | Boos ............................. 455/129 |
| 2006/0141973 A1 * | 6/2006 | Behrens et al. ............... 455/313 |
| 2006/0160510 A1 * | 7/2006 | Seppinen et al. .......... 455/232.1 |
| 2006/0240769 A1 | 10/2006 | Proctor, Jr. et al. |

(Continued)

FOREIGN PATENT DOCUMENTS

JP  2003179521  6/2003

*Primary Examiner* — Lincoln Donovan
*Assistant Examiner* — Adam Houston
(74) *Attorney, Agent, or Firm* — Roylance, Abrams, Berdo & Goodman, L.L.P.

(57) ABSTRACT

A receiver apparatus for tracking and rejecting a Transmit (Tx) signal in a wireless communication system and an operation method thereof are provided. The receiver apparatus includes a controller for receiving channel frequency information of the Tx signal and for controlling an operation for tracking and rejecting a frequency of the Tx signal; a phase locked loop for generating an oscillation frequency by generating a control voltage according to the channel frequency information of the Tx signal under the control of the controller and for filtering a signal corresponding to the oscillation frequency among signals input to a low noise amplifier; and the low noise amplifier for amplifying power while minimizing noise of a signal filtered by the phase locked loop.

13 Claims, 9 Drawing Sheets

U.S. PATENT DOCUMENTS

| | | | |
|---|---|---|---|
| 2006/0273952 A1* | 12/2006 | Krikorian et al. | 342/198 |
| 2007/0082617 A1 | 4/2007 | McCallister | |
| 2007/0105509 A1 | 5/2007 | Muhammad et al. | |
| 2008/0227409 A1* | 9/2008 | Chang et al. | 455/78 |
| 2008/0242245 A1* | 10/2008 | Aparin | 455/126 |
| 2008/0311860 A1* | 12/2008 | Tanaka et al. | 455/73 |
| 2009/0143037 A1* | 6/2009 | Lee et al. | 455/260 |
| 2009/0181624 A1* | 7/2009 | Jones | 455/80 |
| 2009/0213974 A1* | 8/2009 | Haralabidis et al. | 375/376 |
| 2010/0166124 A1* | 7/2010 | Behrens et al. | 375/344 |
| 2010/0285769 A1* | 11/2010 | Conroy et al. | 455/318 |
| 2010/0297956 A1* | 11/2010 | Hayashi et al. | 455/75 |
| 2011/0058601 A1* | 3/2011 | Kim et al. | 375/238 |

* cited by examiner

FIG.1

(CONVENTIONAL ART)

RECEIVER APPARATUS AND METHOD FOR TRACKING AND REJECTING TRANSMIT SIGNAL IN WIRELESS COMMUNICATION SYSTEM

CROSS-REFERENCE TO RELATED PATENT APPLICATION

This application claims the benefit under 35 U.S.C. §119 (a) of Korean Patent Application No. 10-2007-0124195, filed Dec. 3, 2007, in the Korean Intellectual Property Office, the entire disclosure of which is hereby incorporated by reference.

BACKGROUND OF THE INVENTION

1. Field of the Invention

The present invention relates to a receiver apparatus and method for tracking and rejecting a Transmit (Tx) signal in a wireless communication system. More particularly, the present invention relates to an apparatus and method for rejecting a Tx signal introduced to a receiver by performing frequency tracking in a wireless communication system employing a Frequency Division Duplex (FDD) scheme.

2. Description of the Related Art

Conventionally, in order to control power at a specific node in a wireless communication system employing a Frequency Division Duplex (FDD) scheme, a Transmit (Tx) signal of a transmitter is output at a maximum power when a receiver is in a weak electric field. As a result, the Tx signal output from the transmitter is introduced to the receiver in the same node, and thus operates as an interference signal with respect to a Receive (Rx) signal.

Figure 1:
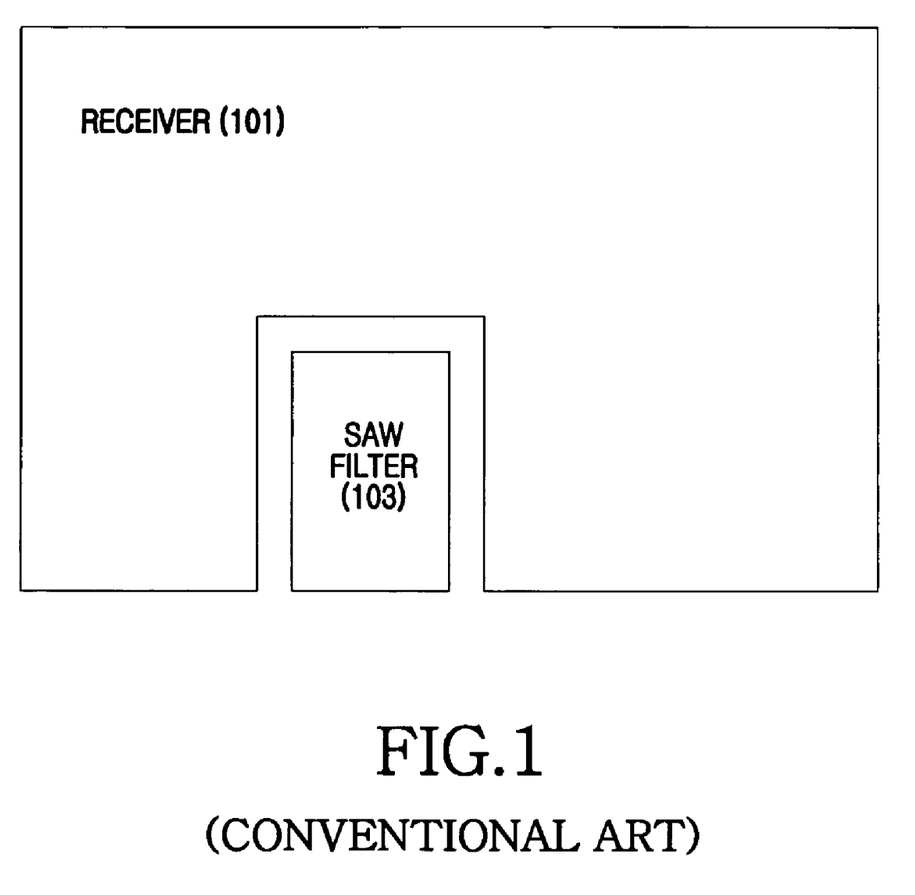
FIG. 1 illustrates a conventional receiver for rejecting a Transmit (Tx) signal using an external element.

Various conventional methods are provided so as to reject the Tx signal introduced to the receiver. For example, as shown in FIG. 1, there is a conventional method in which an external Surface Acoustic Wave (SAW) filter 103 is inserted into a receiver 101 to reject the Tx signal. However, the method of using the SAW filter is inconvenient since the external element has to be additionally purchased.

Figure 2A:
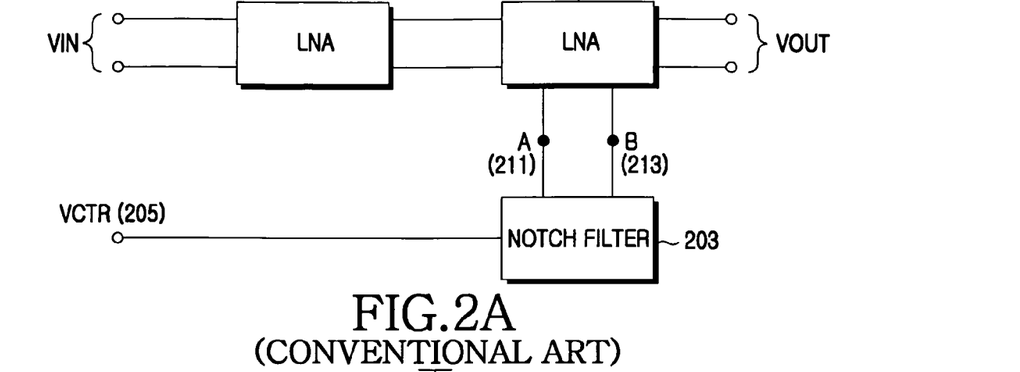
FIGS. 2A to 2C illustrate conventional receivers for rejecting a Tx signal using a manual-type notch filter.
Figure 2B:
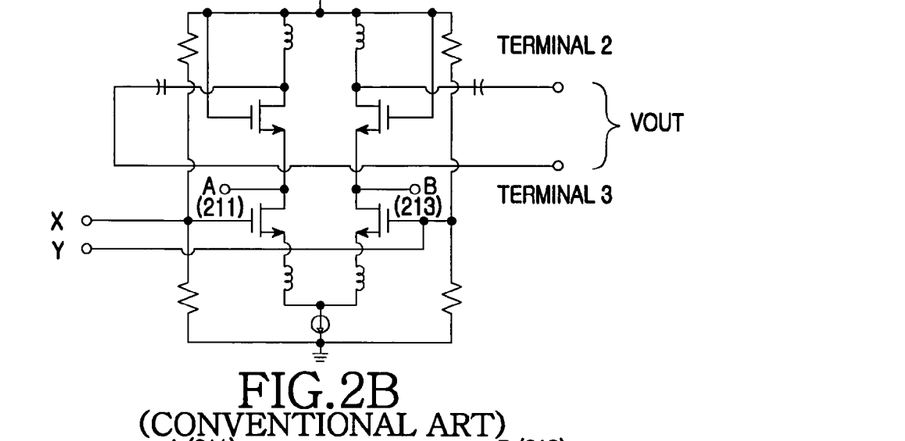
Figure 2C:
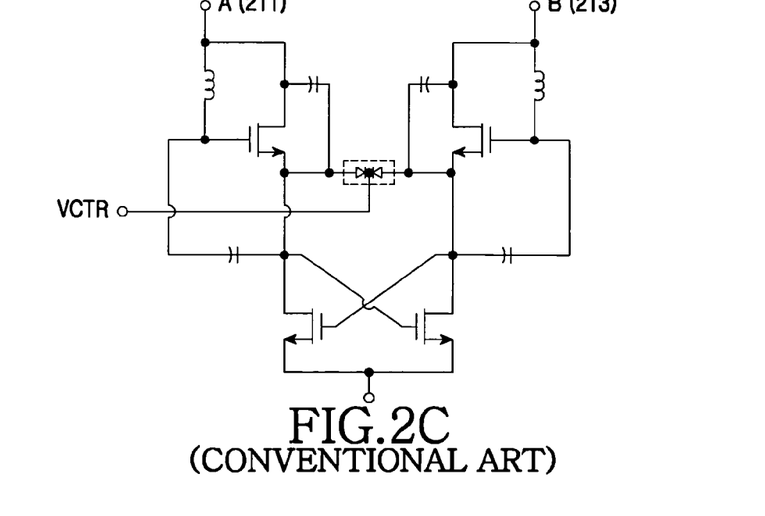

A conventional method in which a receiver rejects a Tx signal introduced to a Low Noise Amplifier (LNA) 201 using a manual-type notch filter 203 is shown in FIG. 2A. That is, in a conventional receiver using the notch filter 203, a frequency band to be rejected is regulated by the notch filter 203 under the control of a Voltage ConTRol (VCTR) 205 in order to reject a signal in the frequency band. In this case, the LNA 201 and the notch filter 203 of the receiver are connected through a node A 211 and a node B 213, and detailed structures thereof are shown in FIG. 2B and FIG. 2C. The notch filter 203 is generally used to reject an image signal of an original signal. The Tx signal has conventionally been rejected by the use of the notch filter 203 according to a characteristic wherein a frequency difference between an Rx signal and a Tx signal is significantly large. The image signal simply has an effect on an actually received signal in a heterodyne structure, and has a significantly different frequency from the actually received signal since a frequency offset has an opposite feature according to a local oscillation signal in a reception band.

However, in the FDD-type wireless communication system, a Tx signal has a frequency band similar to that of an Rx signal. Therefore, there is a limit to the use of a method that rejects the Tx signal by the use of the notch filter. For example, in a Long Term Evolution (LTE) method, the Tx signal has a frequency band of 1900 Mhz and the Rx signal has a narrow frequency band of about 200 Mhz. Therefore, there is a limit when the Tx signal is rejected by using the manual-type notch filter as shown in FIGS. 2A to 2C.

SUMMARY OF THE INVENTION

Exemplary embodiments of the present invention address at least the above-mentioned problems and/or disadvantages and provide at least the advantages described below. Accordingly, an aspect of exemplary embodiments of the present invention is to provide a receiving apparatus and method for tracking and rejecting a Transmit (Tx) signal in a wireless communication system.

Another aspect of exemplary embodiments of the present invention is to provide a receiving apparatus and method for automatically tacking and rejecting a Tx signal, which varies on a real-time basis, using channel information of the Tx signal in a wireless communication system.

Another aspect of exemplary embodiments of the present invention is to provide a receiving apparatus and method in which on/off mechanisms of all elements for tracking a Tx signal are independently implemented to deal with various high-frequency channels.

In accordance with an aspect of exemplary embodiments of the present invention, a receiver apparatus for tracking and rejecting a Tx signal in a wireless communication system is provided. The apparatus comprises a controller for receiving channel frequency information of the Tx signal transmitted from a modem and for controlling an operation for tracking and rejecting a frequency of the Tx signal; a phase locked loop for generating an oscillation frequency by generating a control voltage according to the channel frequency information of the Tx signal under the control of the controller and for filtering a signal corresponding to the oscillation frequency among signals input to a low noise amplifier; and the low noise amplifier for amplifying power while minimizing noise of a signal filtered by the phase locked loop.

In accordance with another aspect of exemplary embodiments of the present invention, a method of operating a receiver for tracking and rejecting a Tx signal in a wireless communication system is provided. The method comprises generating a control voltage using a phase locked loop according to channel frequency information of the Tx signal transmitted from a modem and a reference frequency; oscillating an oscillation frequency according to the control voltage using a Tx signal tracker/rejector; determining whether the oscillation frequency is equal to the channel frequency of the Tx signal by comparing the two frequencies; and if the two frequencies are equal to each other, filtering a signal corresponding to the oscillation frequency among signals input to the Tx signal tracker/rejector.

In accordance with another aspect of exemplary embodiment of the present invention, an apparatus for tracking and rejecting a Transmit (Tx) signal in a wireless communication system is provided. The apparatus comprises a receiver for receiving channel frequency information of the Tx signal transmitted from a modem; and a phase locked loop for generating an oscillation frequency corresponding to the channel frequency information of the Tx signal and for filtering a signal corresponding to the oscillation frequency among signals input to a low noise amplifier.

In accordance with another aspect of exemplary embodiments of the present invention, a method of operating a receiver for tracking and rejecting a Transmit (Tx) signal in a wireless communication system is provided. The method comprises receiving channel frequency information of the Tx signal transmitted from a modem; generating an oscillation frequency corresponding to the channel frequency information of the Tx signal; and filtering a signal corresponding to the oscillation frequency among signals input to a low noise amplifier.

BRIEF DESCRIPTION OF THE DRAWINGS

The above and other aspects, features and advantages of certain embodiments of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a receiving apparatus and method of exemplary embodiments of the present invention will be described wherein a Transmit (Tx) signal, which varies on a real-time basis, is automatically tracked and rejected by using channel information of a Tx signal received from a modem in a wireless communication system.

Figure 3:
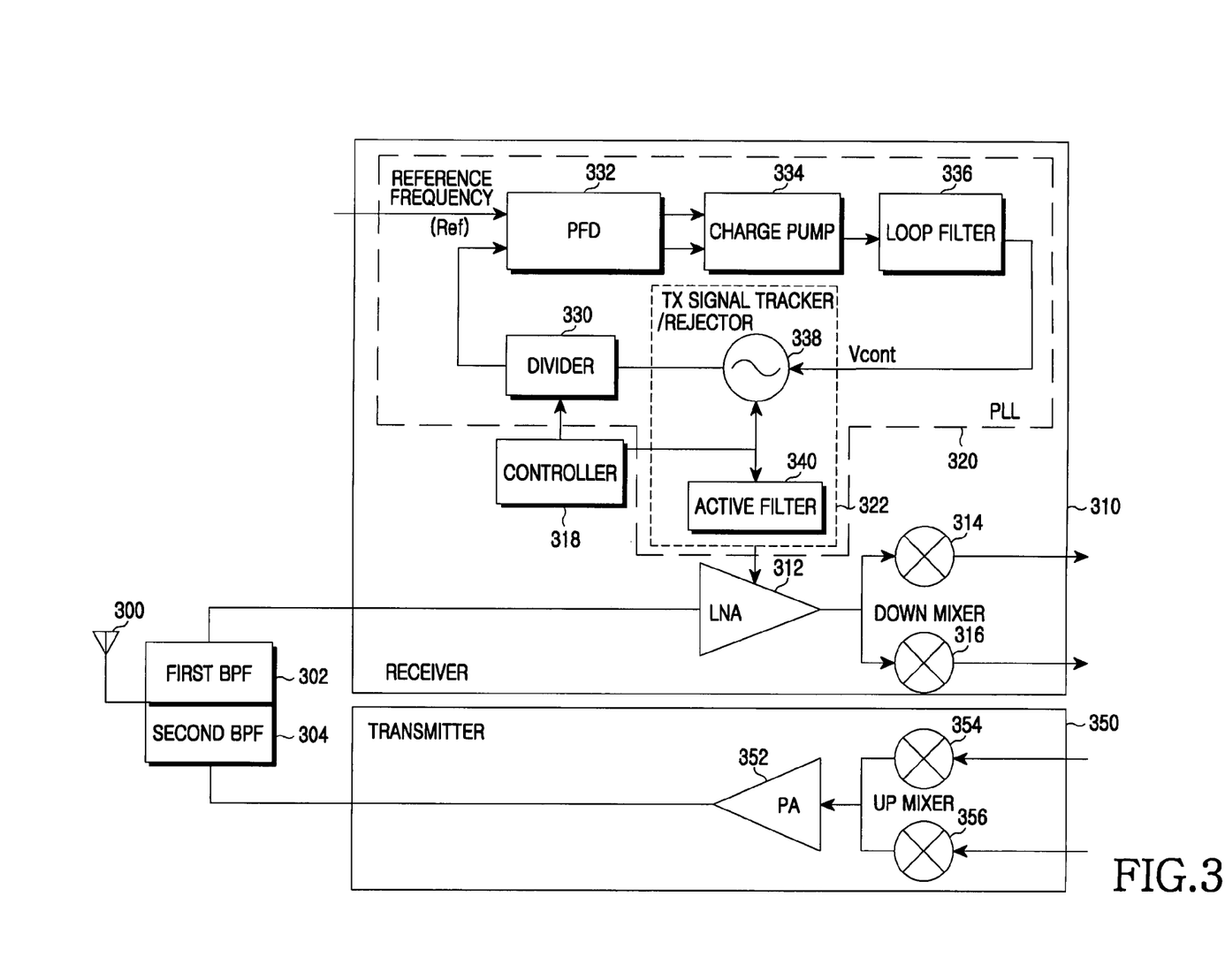
FIG. 3 is a block diagram of a transceiver for rejecting a Tx signal in a wireless communication system according to an exemplary embodiment of the present invention.

FIG. 3 is a block diagram of a transceiver for rejecting a Tx-signal in a wireless communication system according to an exemplary embodiment of the present invention.

Referring to FIG. 3, the transceiver includes a Transmit and Receive (Tx/Rx) antenna 300, first and second Band Pass Filters (BPFs) 302 and 304, a receiver 310, and a transmitter 350. The receiver 310 includes a Low Noise Amplifier (LNA) 312, down mixers 314 and 316, a controller 318, and a Phase Locked Loop (PLL) 320. The transmitter 350 includes a Power Amplifier (PA) 352 and up mixers 354 and 356. The PLL 320 includes a divider 330, a Phase Frequency Detector (PFD) 332, a charge pump 334, a loop filter 336, and a Tx signal tracker/rejector 322.

The first BPF 302 passes a Radio Frequency (RF) signal received through the Tx/Rx antenna 300 and provides the RF signal to the LNA 312 of the receiver 310. The second BPF 304 passes an RF signal received from the PA 352 and transmits the RF signal to a different node through the antenna 300. The signal transmitted through the second BPF 304 has voltage or power which is significantly amplified by the up mixers 354 and 356 and the PA 352. This signal may be introduced to the receiver 310.

Figure 4:
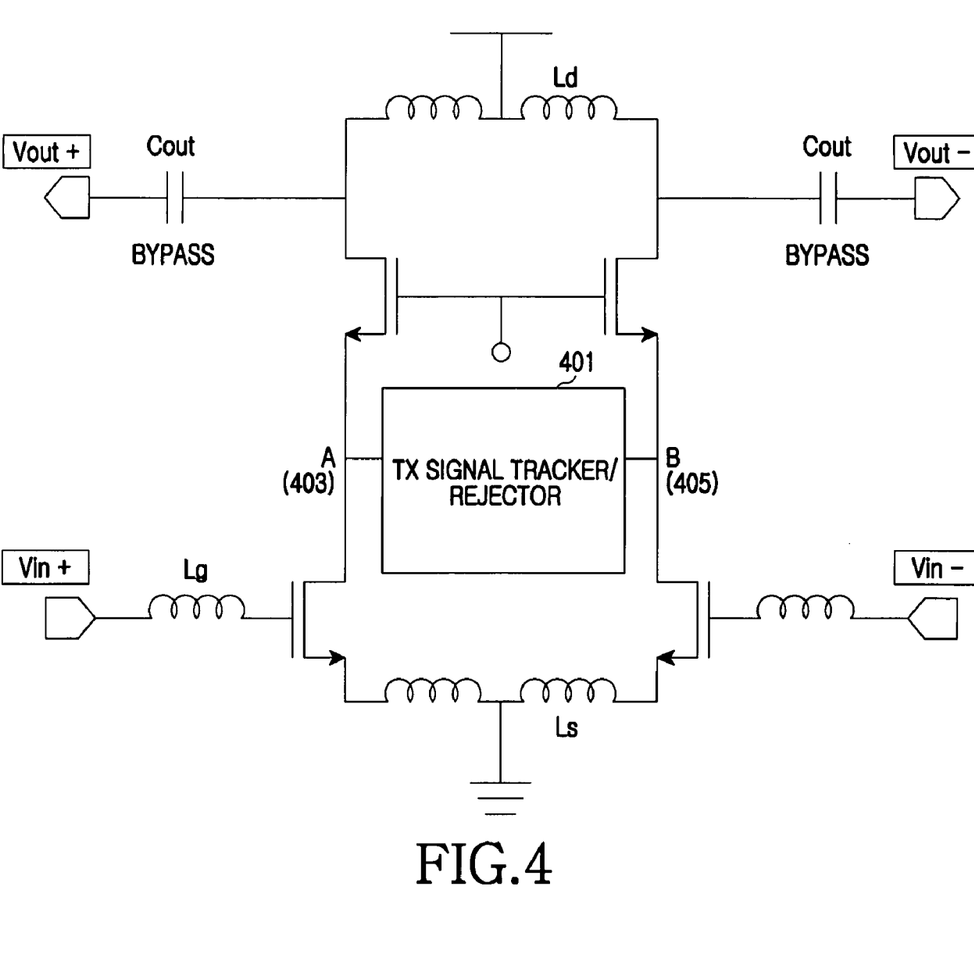
FIG. 4 illustrates a structure of a low noise amplifier for tracking and rejecting a Tx signal in a wireless communication system according to an exemplary embodiment of the present invention.

The LNA 312 amplifies power while minimizing noise of a signal provided from the first BPF 302, and then transmits the signal to the up mixers 354 and 356. In general, the signal received through the antenna 300 has a significantly low power level due to attenuation and noise. Thus, the received signal needs to be amplified. The receiver 310 amplifies the signal using the LNA 312 while avoiding the amplification of the noise included in the signal as much as possible. According to an exemplary embodiment of the present invention, the LNA 312 is connected to the Tx signal tracker/rejector 322. Likewise, the LNA 312 is also connected to a Tx signal tracker/rejector 401 of FIG. 4. As a result, regarding the signal input to the LNA 312, a signal of a specific frequency band estimated as a frequency band of the Tx signal is filtered by the Tx signal tracker/rejectors 322 and 401. Thus, the Tx signal is rejected, and only the Rx signal is amplified with low noise. The LNA 312 is constructed of cascade amps each having a common source differential structure as shown in FIG. 4. Inter-stages 403 and 405 having the cascade structure of FIG. 4 are connected to the Tx signal tracker/rejectors 322 and 401. Therefore, it is possible to minimize deterioration in a noise figure while the Tx signal tracker/rejectors 322 and 401 do not have an effect on input/output matching of the LNA 312.

The controller 318 receives channel information of the Tx signal, which varies on a real-time basis, from a modem, and controls the divider 330 to track and reject a leakage Tx signal introduced from the transmitter 350. That is, the controller 318 receives frequency information of the Tx signal from the modem and provides the frequency information to the divider 330 of the PLL 320. Then, the controller 318 regulates an amount of current provided from the Tx signal tracker/rejector 332 so that the Tx signal tracker/rejector 322 operates as either a Voltage Controlled Oscillator (VCO) 338 or an active filter 340. In other words, to track the Tx signal, the controller 318 provides a larger amount of current than a predetermined amount to the Tx signal tracker/rejector 322 so that the Tx signal tracker/rejector 322 operates as the VCO 338.

In addition, to reject the tracked Tx signal, the controller 318 provides a smaller amount of current than the predetermined amount so that the Tx signal tracker/rejector 322 operates as the active filter 340. In this case, the controller 318 examines whether an oscillation frequency of the VCO 338 is equal to a frequency of the Tx signal received from the modem. If the two frequencies are equal to each other, the controller 318 decreases the amount of the provided current so that the Tx signal tracker/rejector 322, which operates as the VCO 338, operates as the active filter 340.

Further, if the oscillation frequency is equal to the frequency of the Tx signal received from the modem, the controller 318 controls the power on/off of other elements, except for the Tx signal tracker/rejector 322 in the PLL 320, and also provides control to maintain a control voltage $V_{cont}$ input to the Tx signal tracker/rejector 322.

Furthermore, the controller 318 performs the aforementioned operation for tracking and rejecting the Tx signal only when the antenna 300 is in a weak electric-field state or when interference of the Tx signal is significant. In other cases, the same operation as a general RF receiver is performed. The PLL 320 can perform both the operation for tracking and rejecting the Tx signal and the general operation because each element included in the receiver can be tuned on and off independently.

By including the divider (or counter) 330, the PFD 332, the charge pump 334, the loop filter 336, and the Tx signal tracker/rejector 322, the PLL 320 receives channel information of the Tx signal from the controller 318 and tracks the frequency of the Tx signal. The tracked signal is used to reject the Tx signal introduced from the transmitter 350 among signals input to the LNA 312.

In other words, the divider 330 receives the frequency information of the Tx signal from the controller 318, divides the frequency in a predetermined ratio, and then provides the frequency to the PFD 332. The PFD 332 compares the frequency input from the divider 330 with a predetermined reference frequency, generates a clock pulse indicating a difference between the two frequencies, and provides the clock pulse to the charge pump 334. The charge pump 334 analyzes the pulse width of the clock (i.e., digital signal), converts the digital signal into an analog signal of charge (i.e., current), and provides the analog signal to the loop filter 336. According to the current, the loop filter 336 regulates an output voltage, that is, the control voltage $V_{cont}$ provided to the Tx signal tracker/rejector 322.

Figure 5:
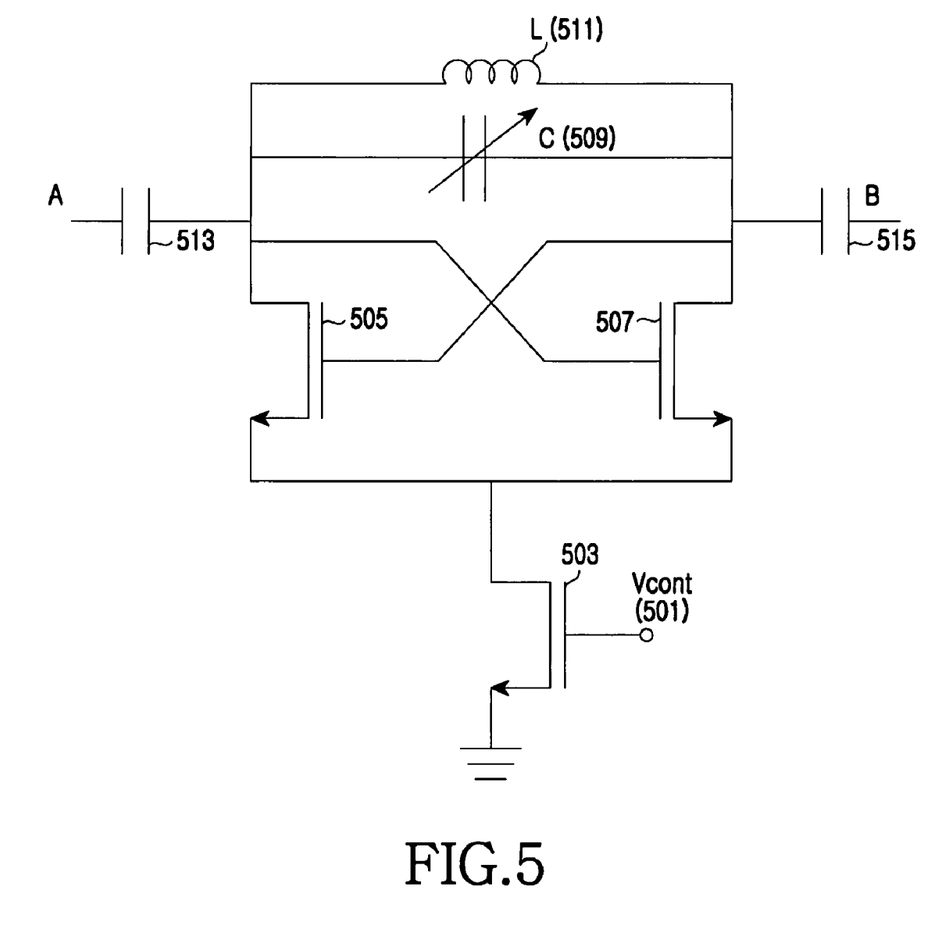
FIG. 5 illustrates a structure of a Tx signal tracker/rejector in a wireless communication system according to an exemplary embodiment of the present invention.
Figure 6:
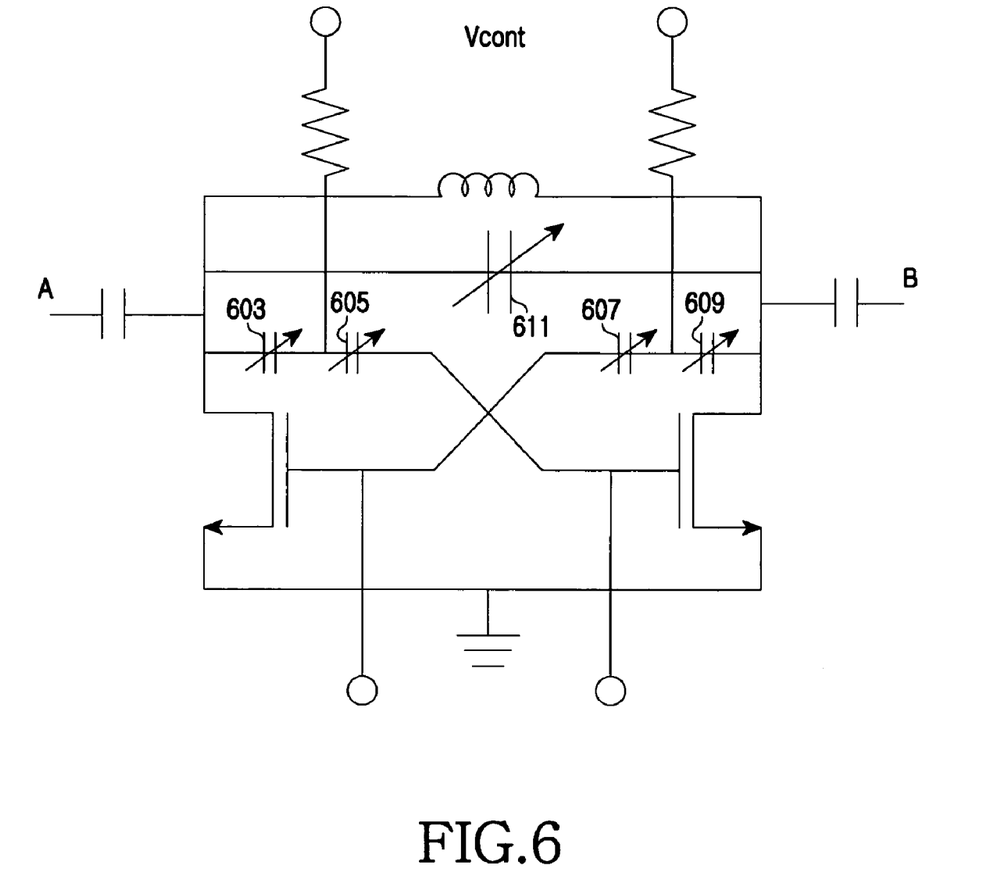
FIG. 6 illustrates a structure of a Tx signal tracker/rejector in a wireless communication system according to another exemplary embodiment of the present invention.

The Tx signal tracker/rejector 322 has a structure as shown in FIG. 5 or FIG. 6. According to the amount of current provided under the control of the controller 318, the Tx signal tracker/rejector 322 operates as either the VCO 338 or the active filter 340. When a large amount of current is provided from the controller 318 to track the frequency of the Tx signal, the Tx signal tracker/rejector 322 operates as the VCO 338 to modify an oscillation frequency according to the control voltage $V_{cont}$ provided from the loop filter 336.

In this case, if the oscillation frequency of the Tx signal tracker/rejector 322 is equal to the frequency of the Tx signal provided from the modem, the Tx signal tracker/rejector 322 receives a small amount of current from the controller 318 and thus operates as the active filter 340.

At this time, each element of the PLL 320 enters to a disable state under the control of the controller 318, and the charge pump 334 is controlled to be a tri-state and thus fixes the control voltage $V_{cont}$ of a corresponding time point. The Tx signal tracker/rejector 322 operates as the active filter 340, and thus rejects a signal (i.e., a signal estimated as the Tx signal) corresponding to the oscillation frequency resulted from the fixed control voltage from a signal input to the LNA 312.

A structure of the Tx signal tracker/rejector 322 which operates as either the VCO 338 or the active filter 340 will now be described. As shown in FIG. 5, the Tx signal tracker/rejector 322 includes three transistors 503, 505, and 507, two capacitors 513 and 515, a varactor 509, and an inductor 511. With this structure, the Tx signal tracker/rejector 322 operates as either the VCO 338 or the active filter 340 by regulating a feedback amount according to an amount of bias current.

In other words, when the amount of bias current is large, the feedback amount increases, and thus the Tx signal tracker/rejector 322 operates as the VCO 338 that oscillates an oscillation frequency, whereas when the amount of bias current is small, the feedback amount decreases, and thus the Tx signal tracker/rejector 322 operates as the active filter 340 that filters the oscillation frequency. When the Tx signal tracker/rejector 322 operates as the VCO 338, the oscillation frequency is modified by the varactor 509 whose capacitance varies depending on an input control voltage $V_{cont}$ 501.

Further, the Tx signal tracker/rejector 322 may be controlled such that the functions of the VCO 338 and the active filter 340 are controlled according to the control voltage input to a gate of the transistor 503.

In addition, as shown in FIG. 6, the Tx signal tracker/rejector 322 may further include a plurality of varactors 603, 605, 607, and 609 along a feedback path instead of controlling the current as described above, so that whether to perform the operation of the VCO 338 or the active filter 340 is determined by using the varactors 603, 605, 607, and 609. For example, to operate as the VCO 338, the Tx signal tracker/rejector 322 may increase capacitances of the varactors 603, 605, 607, and 609 to obtain a large feedback amount, thereby oscillating the oscillation frequency, and to operate as the active filter 340, the Tx signal tracker/rejector 322 may decrease the capacitances of the varactors 603, 605, 607, and 609 to obtain a small feedback amount, thereby performing only the filtering function.

Figure 7:
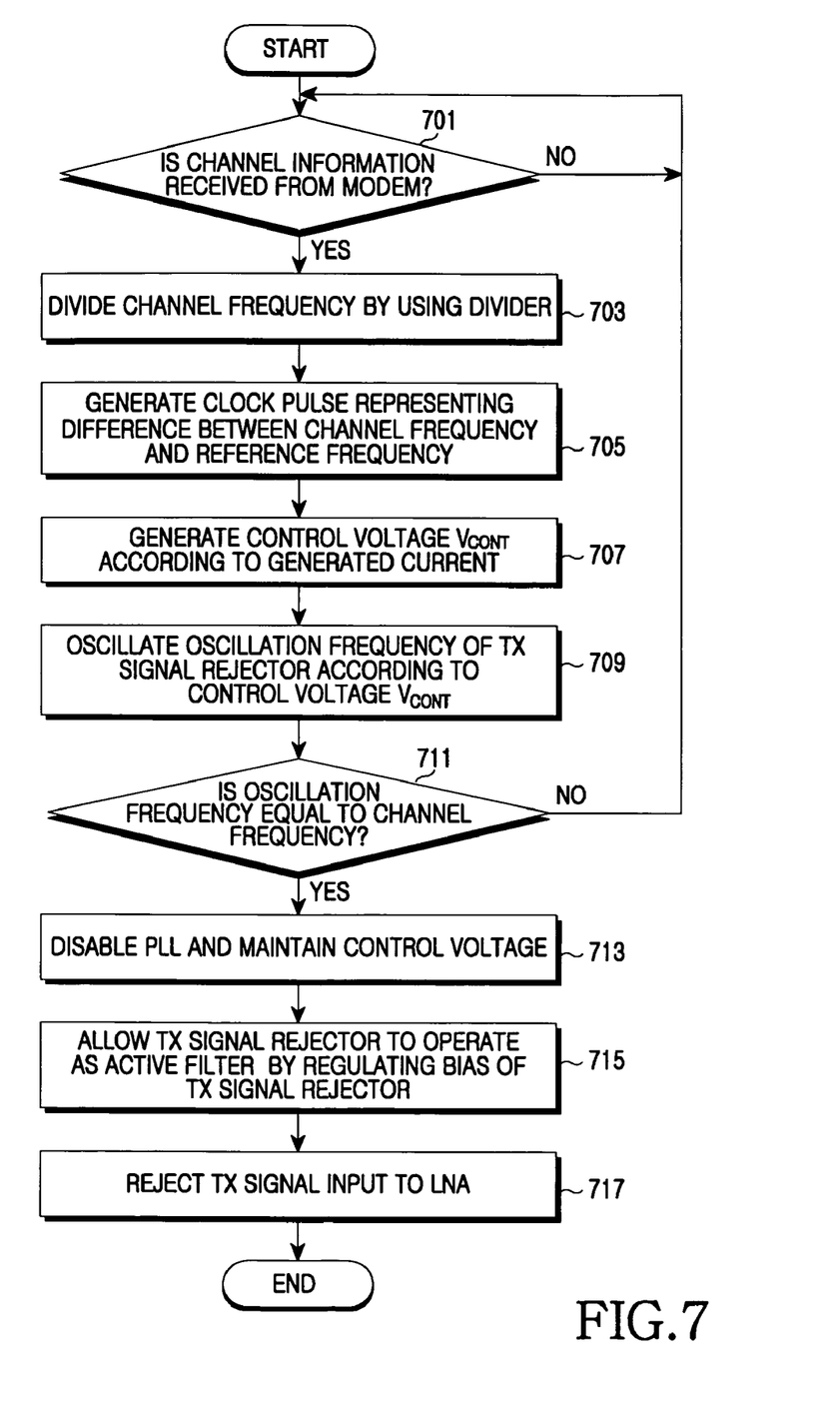
FIG. 7 is a flowchart illustrating a process of tracking and rejecting a Tx signal in a receiver of a wireless communication system according to an exemplary embodiment of the present invention.

FIG. 7 is a flowchart illustrating a process of tracking and rejecting a Tx signal in a receiver of a wireless communication system according to an exemplary embodiment of the present invention.

Referring to FIG. 7, when channel information of the Tx signal is input from a modem in step 701, the receiver divides a channel frequency of the Tx signal in a suitable ratio using the divider 330 in step 703. Then, in step 705, the receiver compares the frequency divided in the suitable ratio with a predetermined reference frequency using the phase frequency detector 332, and then generates a clock pulse signal according a difference between the two frequencies.

In step 707, the receiver generates a current according to the generated clock pulse using the charge pump 334 and the loop filter 336, and then generates a control voltage $V_{cont}$ according to the generated current. In step 709, the receiver allows the Tx signal tracker/rejector 322 to operate as the VCO 338, and controls an oscillation frequency according to the control voltage $V_{cont}$ for oscillation.

In step 711, the receiver examines whether the oscillation frequency is equal to a channel frequency of the Tx signal. If the two frequencies are not equal, the procedure returns to step 701. Otherwise, if the two frequencies are equal, proceeding to step 713, the receiver disables each element included in the PLL 320, and maintains the control voltage $V_{cont}$. The elements included in the PLL 320 are constructed such that power on/off can be performed independently.

In step 715, the receiver allows the Tx signal tracker/rejector 322 to operate as the active filter 340 by regulating the bias current of the Tx signal tracker/rejector 322. In step 717, using the active filter 340, the receiver rejects a signal (i.e., the Tx signal) corresponding to the oscillation frequency among signals input to the LNA 312. Then, the procedure of FIG. 7 ends.

Figure 8A:
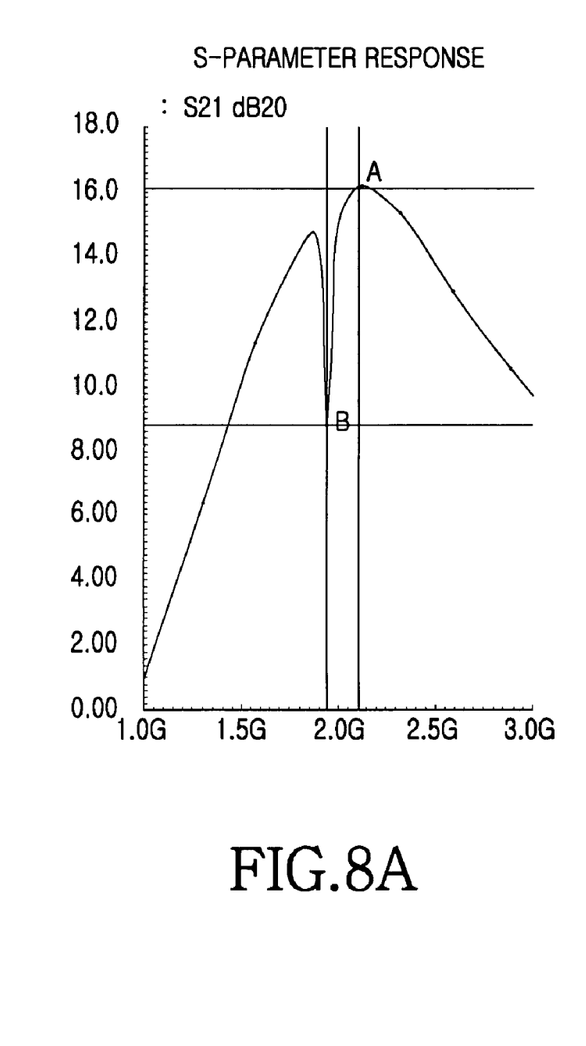
FIGS. 8A and 8B are graphs illustrating an experimental result for rejecting a Tx signal in a wireless communication system according to an exemplary embodiment of the present invention.
Figure 8B:
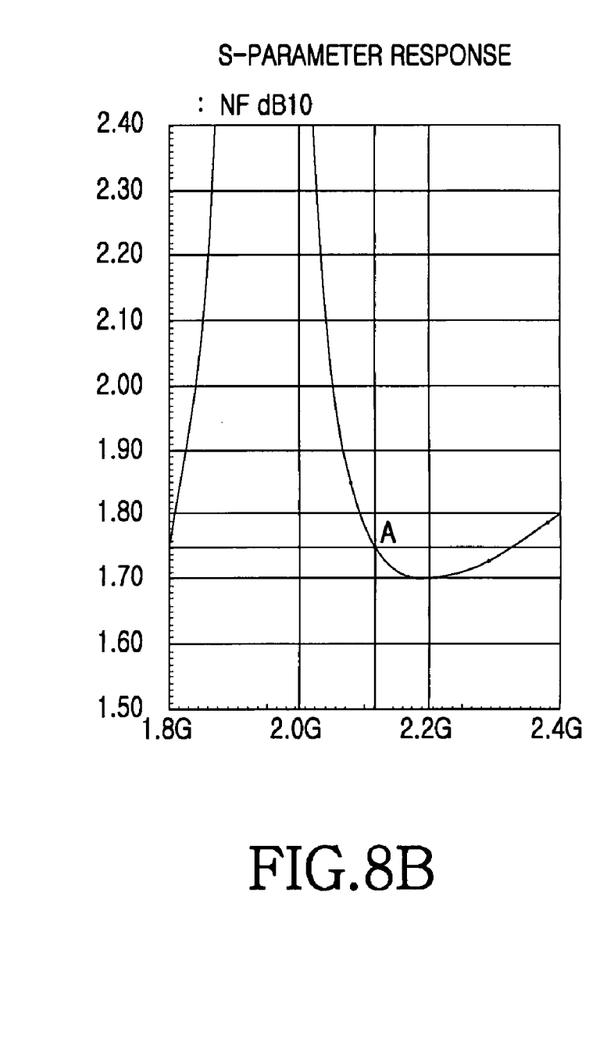

FIGS. 8A and 8B are graphs illustrating an experimental result for rejecting a Tx signal in a wireless communication system according to an exemplary embodiment of the present invention. The result shown in FIGS. 8A and 8B is verified by using an S.LSI 65n RF model parameter. In the graph of FIG. 8A, the horizontal axis represents a frequency, and the vertical axis represents a gain. In the graph of FIG. 8B, the horizontal axis represents a frequency, and the vertical axis represents a noise figure.

Referring to FIG. 8A, when the Tx signal is rejected according to an embodiment of the present invention, by the use of an LNA, a signal of a frequency band corresponding to an Rx signal is amplified by A, and a signal of a frequency band corresponding to the Tx signal is amplified by B. As a result, the Rx signal and the Tx signal have a gain difference greater than 7 dB. In addition, referring to FIG. 8B, it is verified that a noise figure A in a frequency band of the Rx signal is below 2 dB. Therefore, it can be seen that the Tx signal tracker/rejector 322 of the present invention rejects only the Tx signal without having an effect on the LNA 312 in terms of performance degradation.

Figure 9:
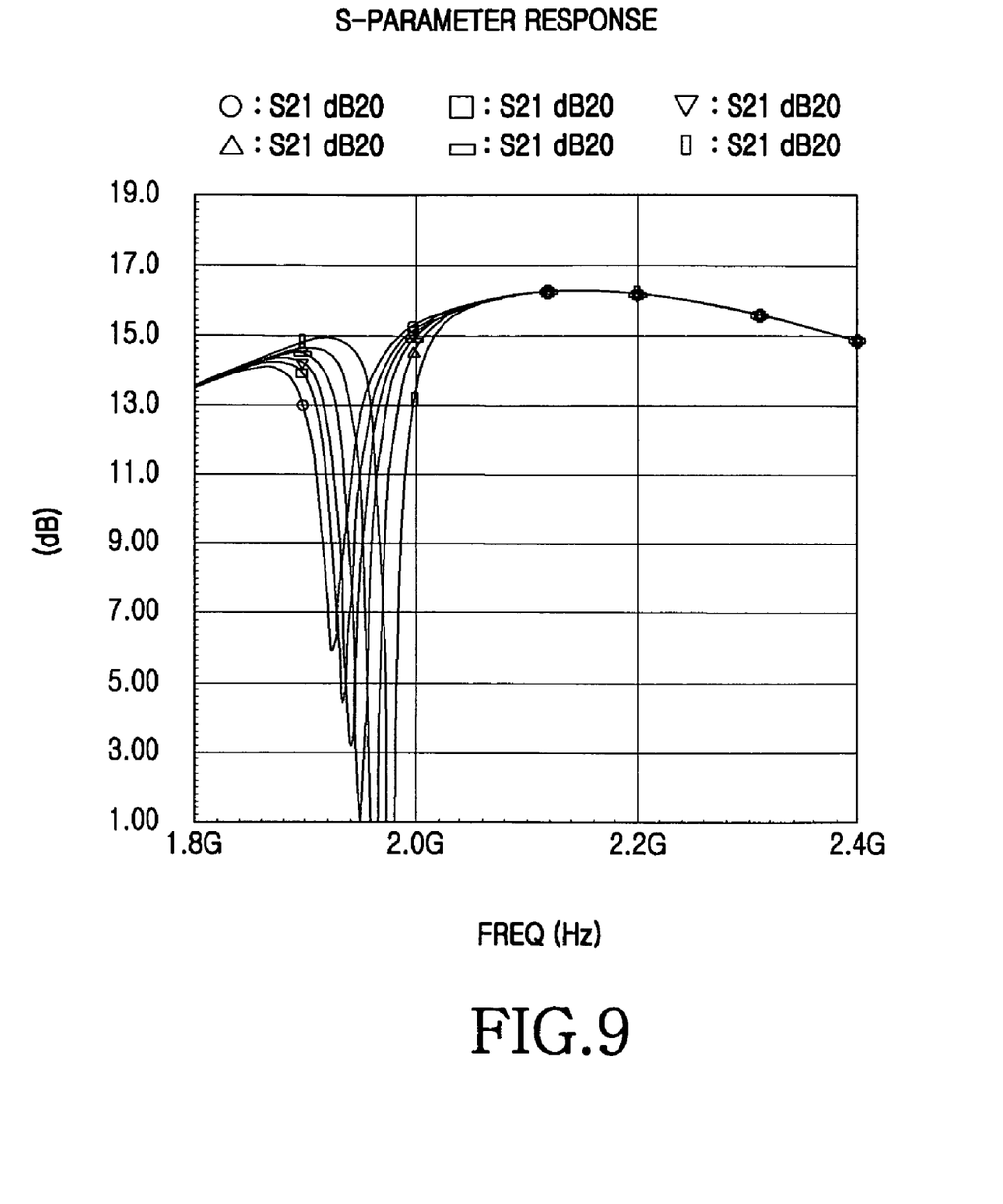
FIG. 9 is a graph illustrating an experimental result for tracking a Tx signal in a wireless communication system according to an exemplary embodiment of the present invention.

FIG. 9 is a graph illustrating an experimental result for tracking a Tx signal in a wireless communication system according to an exemplary embodiment of the present invention. In the graph of FIG. 9, the horizontal axis represents a frequency, and the vertical axis represents a gain.

Referring to FIG. 9, according to an exemplary embodiment of the present invention, a frequency band of the Tx signal in the range of 1.92 GHz and 1.98 GHz is entirely rejected when a signal is amplified by the use of an LNA in a Long Term Evolution (LTE) system.

According to exemplary embodiments of the present invention, a receiver automatically tracts and rejects a Tx signal, which varies on a real-time basis, using channel information of a Tx signal provided from a modem in a wireless communication system. Therefore, there is an advantage in that a circuit for rejecting the Tx signal can be simply implemented without having to additionally use an external element. In addition, by independently operating the power on/off of each element, the receiver can perform an operation for tracking and rejecting the Tx signal only when an antenna is in a weak electric field or an interference of the Tx signal is significant, and in other cases, perform the same operation as a general RF receiver.

While certain exemplary embodiments of the present invention have been shown and described herein with reference to certain preferred embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in exemplary embodiments of the present invention.

What is claimed is:

1. A receiver apparatus for tracking and rejecting a Transmit (Tx) signal in a wireless communication system, the apparatus comprising:
    a controller adapted to receive channel frequency information of the Tx signal and to control an operation for tracking and rejecting a frequency of the Tx signal;
    a phase locked loop adapted to generate an oscillation frequency by generating a control voltage according to the channel frequency information of the Tx signal under the control of the controller and to filter a signal corresponding to the oscillation frequency among signals input to a low noise amplifier; and
    the low noise amplifier adapted to amplify power while minimizing noise of the signal filtered by the phase locked loop.

2. The apparatus of claim 1, wherein the phase locked loop comprises:
    a divider adapted to receive the channel frequency information of the Tx signal, for dividing the channel frequency in a predetermined ratios;
    a phase frequency detector adapted to generate a clock pulse which indicates a difference between the frequency provided from the divider and a reference frequency;
    a charge pump adapted to generate a current according to the generated clock pulse;
    a loop filter adapted to generate a control voltage according to the generated current; and
    a Tx signal tracker/rejector adapted to generate an oscillation frequency using the control voltage under the control of the controller or to filter a signal corresponding to the oscillation frequency.

3. The apparatus of claim 2, wherein the Tx signal tracker/rejector operates as a voltage controlled oscillator adapted to oscillate the oscillation frequency depending on the control voltage according to an amount of bias current provided under the control of the controller or operate as an active filter for filtering a signal of a frequency band corresponding to the oscillation frequency.

4. The apparatus of claim 3, wherein, under the control of the controller, the Tx signal tracker/rejector operates as the voltage controlled oscillator when the amount of bias current is above a reference point, and operates as the active filter when the amount of bias current is below the reference point.

5. The apparatus of claim 1, wherein, if the oscillation frequency of the phase locked loop is equal to the channel frequency of the Tx signal, the controller disables operations of all elements included in the phase locked loop and maintains the generated control voltage.

6. The apparatus of claim 1, wherein, when the oscillation frequency of the phase locked loop is different from the channel frequency of the Tx signal, the controller controls the phase locked loop to generate the oscillation frequency by generating the control voltage, and when the two frequencies are equal to each other, controls the phase locked loop to filter a signal corresponding to the oscillation frequency.

7. A method of operating a receiver for tracking and rejecting a Transmit (Tx) signal in a wireless communication system, the method comprising the steps of:
    generating a control voltage using a phase locked loop according to channel frequency information of the Tx signal and a reference frequency;
    oscillating an oscillation frequency according to the control voltage using a Tx signal tracker/rejector;
    determining whether the oscillation frequency is equal to the channel frequency of the Tx signal by comparing the two frequencies; and
    if the two frequencies are equal to each other, filtering a signal corresponding to the oscillation frequency among signals input to the Tx signal tracker/rejector.

8. The method of claim 7, wherein the generating a control voltage comprises:
    dividing the channel frequency of the Tx signal in a predetermined ratio and outputting the divided channel frequency;
    generating a clock pulse indicating a difference between the output frequency and a reference frequency;
    generating a current according to the generated clock pulse; and
    generating a control voltage according to the generated current.

9. The method of claim 7, further comprising, if the two frequencies are equal to each other, disabling operations of all elements included in the phase locked loop and maintaining the generated control voltage.

10. The method of claim 7, further comprising, if the two frequencies are equal to each other, filtering a signal corresponding to the oscillation frequency by providing an amount of bias current above a reference point to the Tx signal tracker/rejector.

11. The method of claim 7, further comprising, if the two frequencies are not equal to each other, oscillating the oscillation frequency according to the control voltage by continuously providing an amount of bias current below the reference point to the Tx signal tracker/rejector.

12. An apparatus for tracking and rejecting a Transmit (Tx) signal in a wireless communication system, the apparatus comprising:

a receiver adapted to receive channel frequency information of the Tx signal; and
a phase locked loop adapted to generate an oscillation frequency corresponding to the channel frequency information of the Tx signal and to filter a signal corresponding to the oscillation frequency among signals input to a low noise amplifier.

13. A method of operating a receiver for tracking and rejecting a Transmit (Tx) signal in a wireless communication system, the method comprising:

receiving channel frequency information of the Tx signal;
generating an oscillation frequency corresponding to the channel frequency information of the Tx signal; and
filtering a signal corresponding to the oscillation frequency among signals input to a low noise amplifier.

* * * * *